Patented Feb. 21, 1950

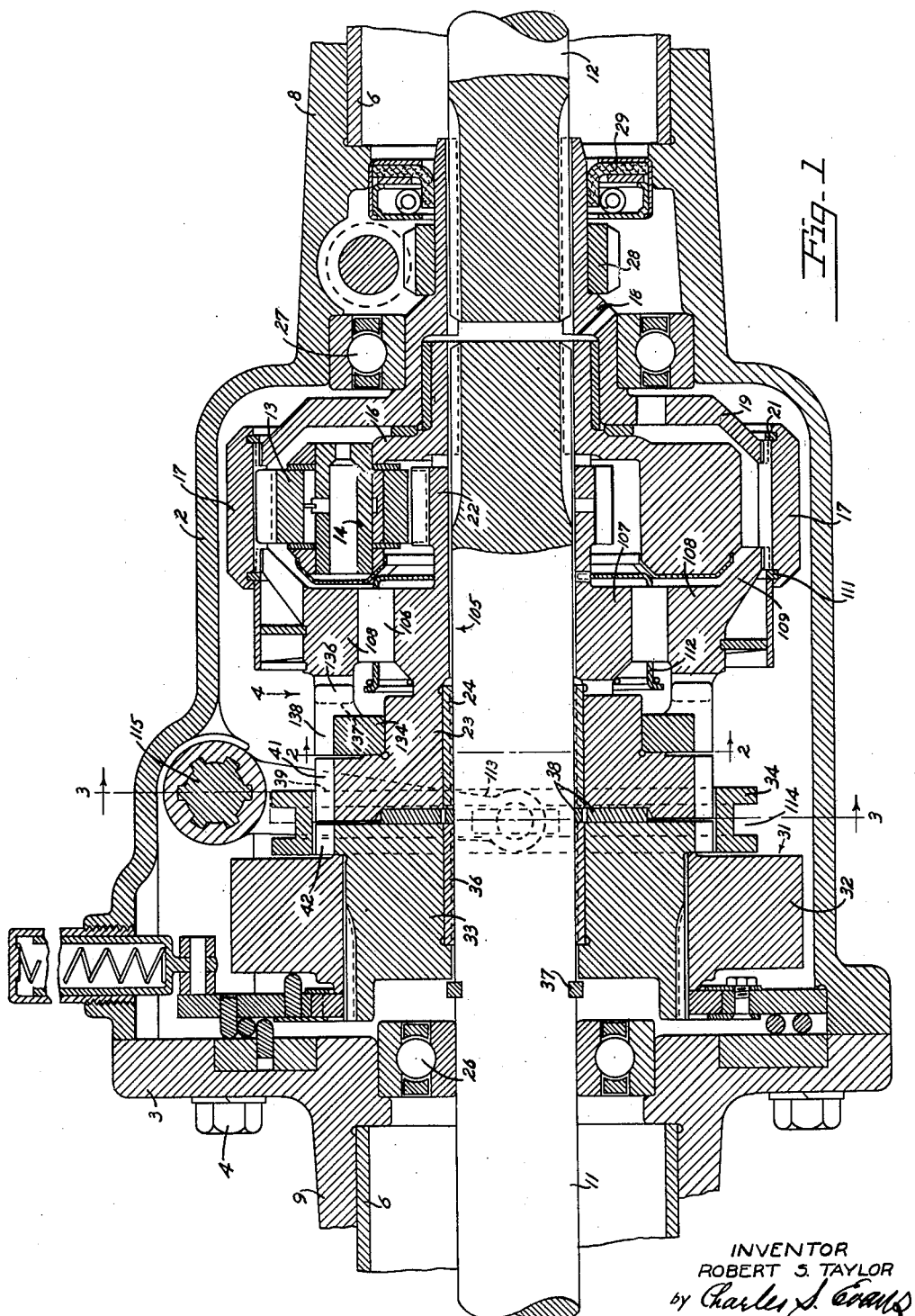

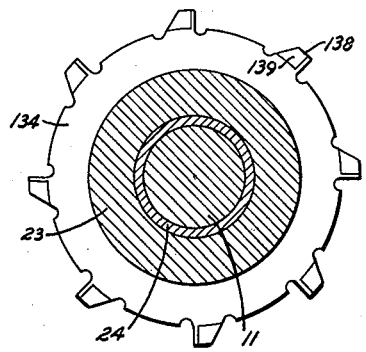
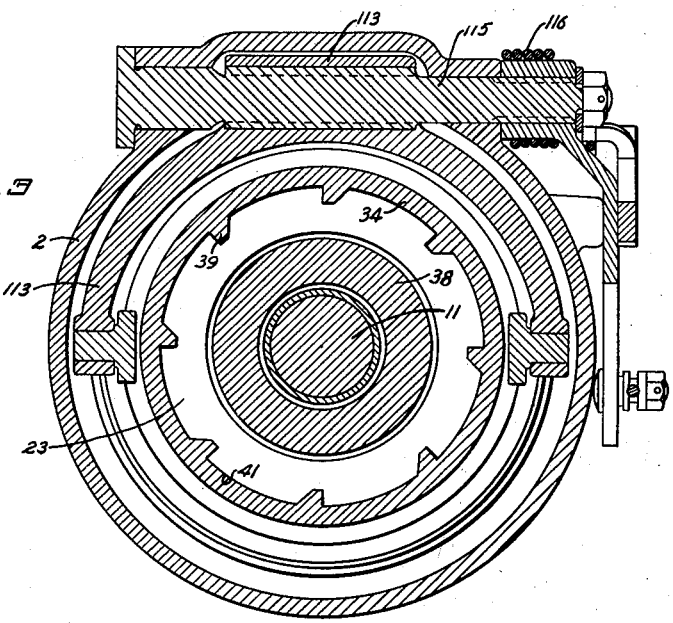
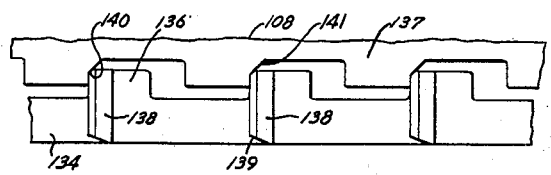

2,498,464

UNITED STATES PATENT OFFICE 2,498,464

SYNCHRONIZING CLUTCH FOR SPEED CHANGE SYSTEMS

Robert S. Taylor, Seattle, Wash.; Florence E. Taylor executrix of said Robert S. Taylor Original application August 25, 1942, Serial No. 456,299. Divided and this application April 17, 1946, Serial No. 662,675

6 Claims. (Cl. 192—53)

My invention relates to mechanism for changing speed ratios in vehicles; and more particularly to a synchronizing clutch in said mechanism.

The principal object of the invention is to provide an improved syncro-mesh clutch for connecting parts of the gearing together for direct drive.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

This application is a division of my copending application Serial No. 456,299, filed August 25, 1942, which resulted in Letters Patent No. 2,398,814, dated April 23, 1946.

Referring to the drawings:

Figure 1 is an axial sectional view of my transmission, of which my synchronizing clutch forms a part.

Figure 2 is a detail sectional view showing the floating member of the syncro-mesh clutch. The plane of section is indicated by the line 2—2 of Figure 1.

Figure 3 is a transverse sectional view of the clutch shifting mechanism, taken in a plane indicated by line 3—3 of Figure 1.

Figure 4 is a fragmentary view taken in the direction of arrow 4 of Figure 1, showing portions of the floating clutch member and orbit gear connection. In this view the normally curved surfaces of the parts are flattened out into a plane to illustrate the structure more clearly.

My speed change transmission comprises a gearing embodying torque means for automatically changing between overdrive and direct drive; and means associated with the regular clutch and/or throttle mechanisms for modifying automatic operation of the unit. The gearing employed in my transmission is preferably a planetary system; and the overdrive ratio is established by an improved brake and lock mechanism for holding a part of the gearing against rotation. An improved syncro-mesh clutch is provided for connecting parts of the gearing together for direct drive; and comprises the subject matter of the present application. In order to explain the construction and operation of the clutch, the related and adjacent parts of the transmission as a whole must be referred to briefly.

My transmission comprises a housing having a body portion 2 and end plate 3 secured together by screws 4. The housing is preferably interposed in torque tube 6 of an automobile behind the regular transmission with sections of the tube engaged by necks 8 and 9 on the housing body and end plate respectively. Leading portion 11 of the propeller shaft provides the drive shaft of my unit, and trailing portion 12 forms the driven shaft. When power is being transmitted through the unit from drive shaft 11 to driven shaft 12 the mechanism is subjected to a certain kind of loading which I shall refer to as a "driving load"; and when the rear wheels of the car tend to overrun the rate at which they are driven the mechanism is subjected to a different loading which I term "coasting load"; these terms being conventional in the trade.

The overdrive transmission chosen for purposes of illustration comprises a planetary gearing having a planet pinion 13 journaled on shaft 14 mounted on a pinion carrier 16 splined to drive shaft 11. Orbit gear 17 of the planetary system is mounted for rotation with driven shaft 12 by a hub 18 splined to the shaft and provided with a flange 19 peripherally splined to the orbit gear and held by retaining ring 21. Sun gear 22 is formed as part of a sleeve 23 freely journaled on the drive shaft on a bearing 24.

The entire mechanism is journaled in the housing by two main bearings 26 and 27. One of these is disposed about the drive shaft and is retained by end plate 3, while the other is interposed between hub 18 and neck 8 of the main housing. Hub 18 also carries speedometer gear 28; and an oil retaining ring 29 is interposed between the hub and neck behind gear 28.

Means are provided for holding the sun gear against rotation to effect planetary operation of the system for establishing an overdrive connection between the shafts. For this purpose a brake mechanism generally indicated by reference numeral 31 is employed; the brake being engaged by reverse (counter-clockwise) torque of the sun gear under coasting load, and disengaged by forward (clockwise) torque of the sun gear under driving load. In the present specification the references to direction of rotation and torque (clockwise and counter-clockwise) are taken as viewed from the left in Figure 1; the clockwise rotation being considered as forward in the conventional manner.

Brake 31 for establishing the overdrive connection comprises a peripherally toothed rotor 32 splined to a hub 33 connectable to sun gear sleeve 23 through a shiftable clutch member 34. Hub 33 is freely journaled on drive shaft 11 by bearing 36 and is restrained axially by retaining ring 37 and spacer bearings 38. By this arrangement the brake rotor 32 is connected with the sun gear whenever clutch member 34 is in the position shown in Figure 1 with its teeth 39 engaging teeth 41 and 42 respectively of the sleeve and hub.

Means which are described in detail in my said copending application, are provided for locking the rotor 32 against rotation, and for freeing it to permit its rotation, but this mechanism forms no part of the present invention and need not be described here. It is sufficient to say that when the brake is locked, the sun gear is held against clockwise rotation, and the driving thrust is transmitted by drive shaft 11 to orbit gear 17 through planet pinion 13 which in turn planetates about the fixed sun gear. The orbit gear thus rotates forwardly at a faster rate than the drive shaft, and this is reflected by increased speed of driven shaft 12 in accordance with the usual planetary overdrive principle.

With the brake unlocked it will disengage to release the sun gear under the torque conditions imposed by a driving load. In order to establish a direct drive connection upon release of the sun gear, means are provided for locking the parts of the planetary gearing together for rotation as a unit. A one-way clutch generally designated by reference numeral 105 is interposed between the sun and orbit gears. This direct drive clutch comprises rollers 106 working between an inner clutch ring 107 formed on sun gear sleeve 23, and an outer clutch ring 108 having a flange 109 peripherally splined to an end of the orbit gear and held by retaining ring 111. The clutch rollers are held by a suitable spring pressed cage 112, and coact with flats on the inner clutch ring 107 to connect the sun and orbit gears together when the sun gear tends to run clockwise at a rate faster than the orbit gear.

The one-way clutch thus functions to lock up the planetary gearing as soon as the sun gear is released by overdrive brake 31, because a driving load on the unit tends to spin the sun gear clockwise. Shock of clutch engagement is avoided by the inertia of brake rotor 32 and the connected parts which function as a fly wheel to prevent the released sun gear from accelerating too rapidly. With this inertia load to overcome, the sun gear gradually comes up to the speed of the orbit gear, whereupon the one-way clutch engages smoothly and without clash.

Means are still further provided for shifting the slidable clutch member 34 to positively lock the parts of the planetary gearing together for direct drive. When member 34 is in the left hand position shown in Figure 1, the sun gear is connected with the overdrive brake as has already been described. By shifting the member toward the right the brake mechanism is cut out, and positive connection is established between the sun and orbit gears. Shifting is accomplished by a yoke 113 engaging an annular groove 114 in member 34. The yoke is splined to a shaft 115 journaled in the housing. A spring 116, Figure 3, interposed between the shaft and housing normally urges clutch member 34 toward the left.

Means described in detail in my said copending application, are provided for rocking the shaft 115 to put the unit into direct drive automatically whenever the regular transmission is put into reverse; and means manually operated from the dash is also provided for rocking the shaft to shift the unit into direct drive at any time.

The means for positively connecting the sun and orbit gears together when clutch member 34 is shifted to the right includes a syncro-mesh feature. As shown in Figure 1, a floating clutch ring 134 is interposed between sun gear sleeve 23 and orbit gear part 108. This floating ring is freely journaled on the sun gear sleeve and is connected for limited turning movement relative to part 108 by end teeth 136 on ring 134 loosely meshed with teeth 137 on part 108 respectively. Figure 4 clearly shows the free play between these teeth which allows for the desired relative movement.

Floating ring 134 also has peripheral teeth 138 adapted to be engaged by the internal teeth 39 on clutch member 34 when the latter is shifted to the right. As seen in Figures 2 and 3, teeth 39 and 138 are relatively narrow and are widely spaced circumferentially. This wide spacing will insure meshing of the teeth in most positions of the sun and orbit gears. The adjacent ends of teeth 39 and 138 are also beveled as indicated by bevels 139 on teeth 138 in Figures 2 and 4. Should the teeth meet end on, these bevels usually will force the floating ring to turn enough to permit meshing; it being remembered that the floating ring is free to turn a limited degree relative to the shiftable member because of the loose connection with part 108.

The only other condition to take care of is the exceptional one where the narrow flat end faces of teeth 39 and 138 happen to abut squarely. Therefore I provide each tooth 138 with a relatively narrow beveled edge 140, presenting a narrow bearing surface adapted to slide along the inclined plane 141 formed on a fillet at the base of each tooth 137 on gearing part 108. When the shiftable member 34 is moved to the right (of Figure 1), and the flat end faces of teeth 39 and 138 do happen to engage, the axial pressure on the floating ring 134 by the shiftable member 34, forces the floating ring toward the part 108, the narrow beveled edges 140 sliding along the wider inclined planes 141, and the entire floating ring rotating relative to the part 108 and shiftable member 34 enough to move the abutting flat ends of the teeth 39 and 138 out of alignment and permit meshing thereof.

I claim:

1. In a speed change system, a gearing, a shiftable clutch member mounted for rotation with a part of the gearing and having teeth thereon, a floating clutch member having teeth adapted to mesh with those of the shiftable member, means for positively connecting the floating member for rotation with a second part of the gearing and allowing a limited degree of relative turning movement between the floating member and said second part, whereby the teeth on the floating member may move past those on the shiftable member to permit meshing thereof, and means for effecting said turning movement upon axial pressure applied to the floating member by said shiftable member.

2. In a speed change system, a gearing, a shiftable clutch member mounted for rotation with a part of the gearing and having teeth thereon, a floating clutch member having teeth adapted to mesh with those of the shiftable member, means for positively connecting the floating member for rotation with a second part of the gearing and allowing a limited degree of relative turning movement between the floating member and said second part, whereby the teeth on the floating member may move past those on the shiftable member to permit meshing thereof, and means including an inclined plane for effecting said turning movement upon axial pressure being applied to the floating member by said shiftable member.

3. In a speed change system, a gearing, a shiftable clutch member mounted for rotation with a part of the gearing and having teeth thereon, a floating clutch member having teeth adapted to mesh with those of the shiftable member, the adjacent ends of the teeth of both shiftable member and clutch member being beveled and the said teeth of both members being widely spaced circumferentially, and means for positively connecting the floating member for rotation with a second part of the gearing and allowing a limited degree of relative turning movement between the floating member and said second part, whereby the teeth on the floating member may move past those on the shiftable member to permit meshing thereof.

4. In a speed change system, a gearing, a shiftable clutch member mounted for corelative rotation with a part of the gearing and having teeth thereon, a floating clutch member having teeth adapted to mesh with those of the shiftable member, means including a series of teeth extending from the side of the floating member for connecting the floating member for rotation with a second part of the gearing and allowing a limited degree of relative turning movement between the floating member and said second part, whereby the teeth on the floating member may move past those on the shiftable member to permit meshing thereof, and means for effecting said turning movement upon axial pressure applied to the floating member by said shiftable member.

5. In a speed change system, a gearing, a shiftable clutch member mounted for rotation with a part of the gearing and having teeth thereon, a floating clutch member having teeth adapted to mesh with those of the shiftable member, means including a series of teeth extending from the side of the floating member and a series of teeth extending from a second part of the gearing for connecting the floating member for rotation with said second part of the gearing, said teeth in both series being spaced apart circumferentially to allow a limited degree of relative turning movement between the floating member and said second part, whereby the teeth on the floating member may move past those on the shiftable member to permit meshing thereof, and means for effecting said turning movement upon axial pressure applied to the floating member by said shiftable member.

6. In a speed change system, a gearing, a shiftable clutch member mounted for rotation with a part of the gearing and having teeth thereon, a floating clutch member having teeth adapted to mesh with those of the shiftable member, a series of relatively widely spaced teeth extending from the side of the floating member, each tooth of the series having a relatively narrow beveled edge, a second series of relatively narrow teeth extending from a second part of the gearing and into the spaces between the teeth of the first series, each tooth of the second series having at its base an inclined plane to engage the narrow beveled edge of the adjacent tooth of the first series to force a relative turning movement between the floating member and the second gearing part upon axial pressure applied to the floating member by the shiftable member to permit meshing of the shiftable member teeth and the floating member teeth.

ROBERT S. TAYLOR.

REFERENCES CITED

The following references are of record in the file of this patent:

UNITED STATES PATENTS

| Number | Name | Date |
|---|---|---|
| 1,784,722 | Carickhoff | Dec. 9, 1930 |
| 2,238,723 | Fishburn | Apr. 15, 1941 |
| 2,258,475 | Sinclair | Oct. 7, 1941 |